Oct. 12, 1948.    R. M. NARDONE    2,451,109
ACTUATOR AND CONTROL ASSEMBLY FOR
RETRACTABLE LANDING GEARS
Filed Jan. 28, 1944    5 Sheets-Sheet 3
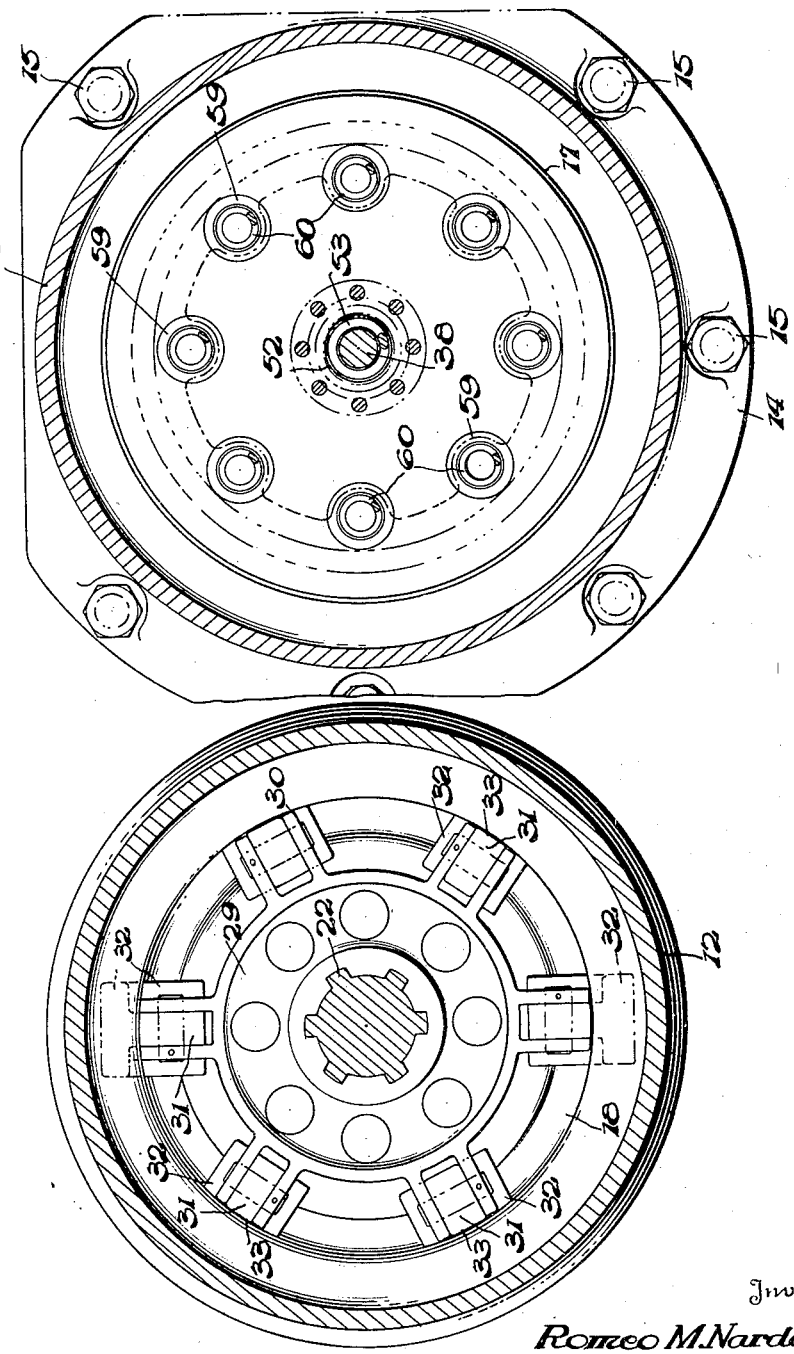

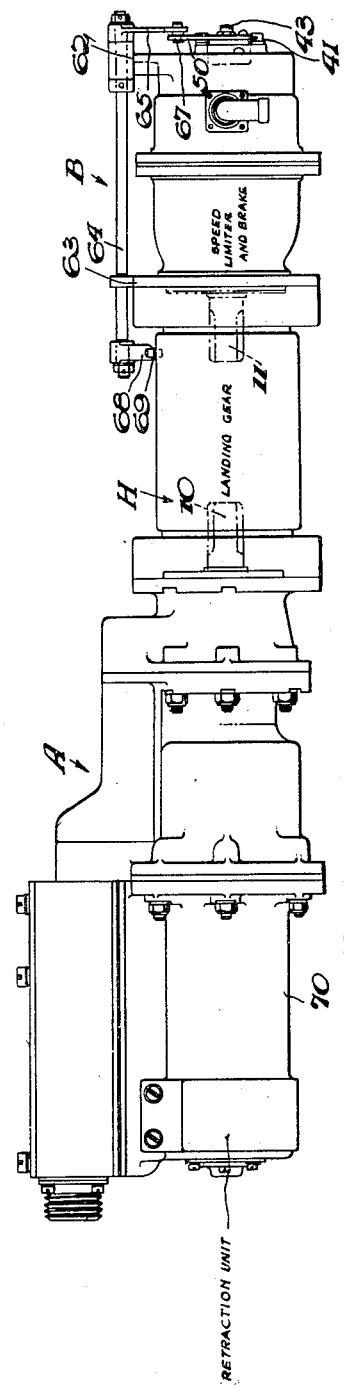

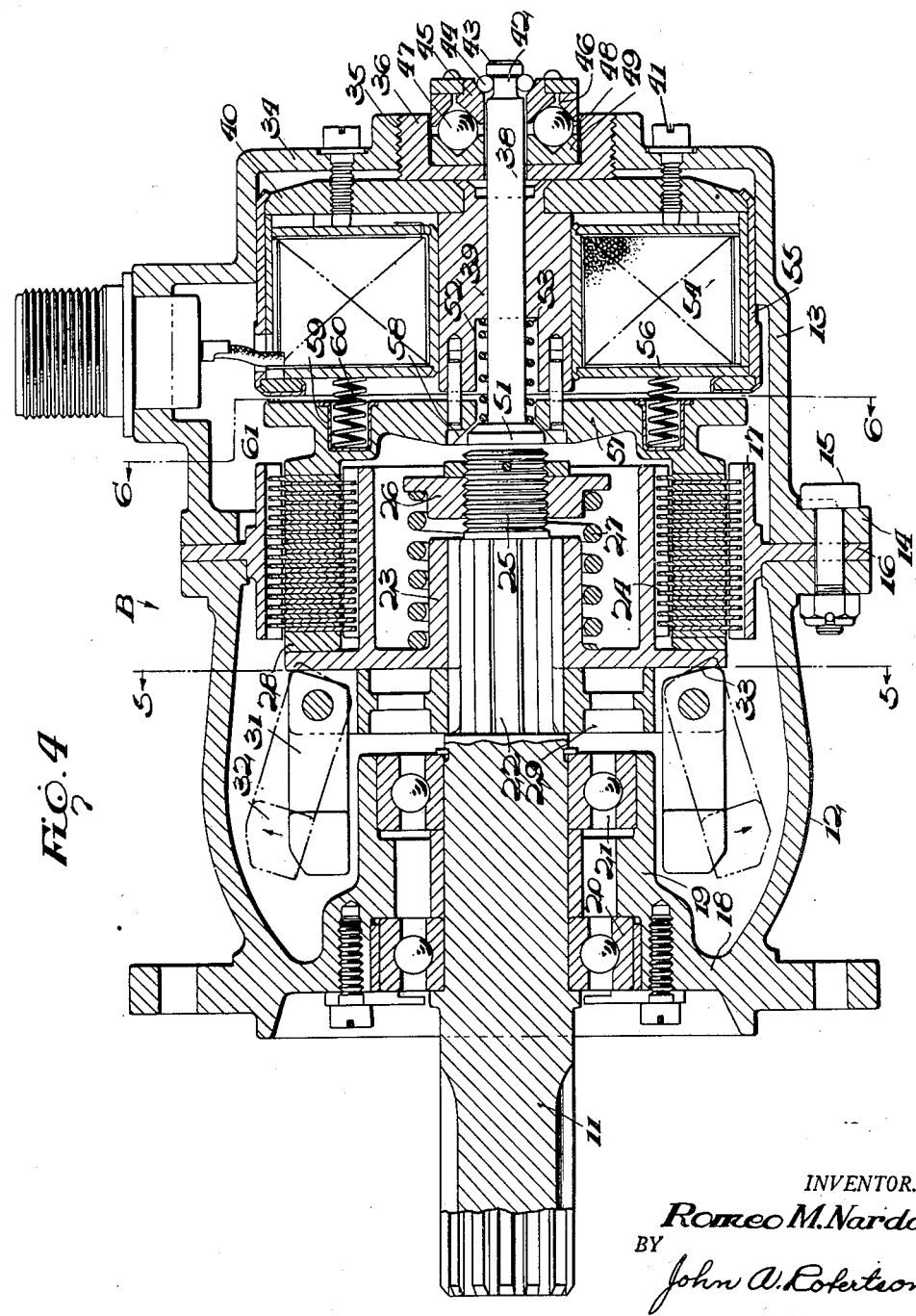

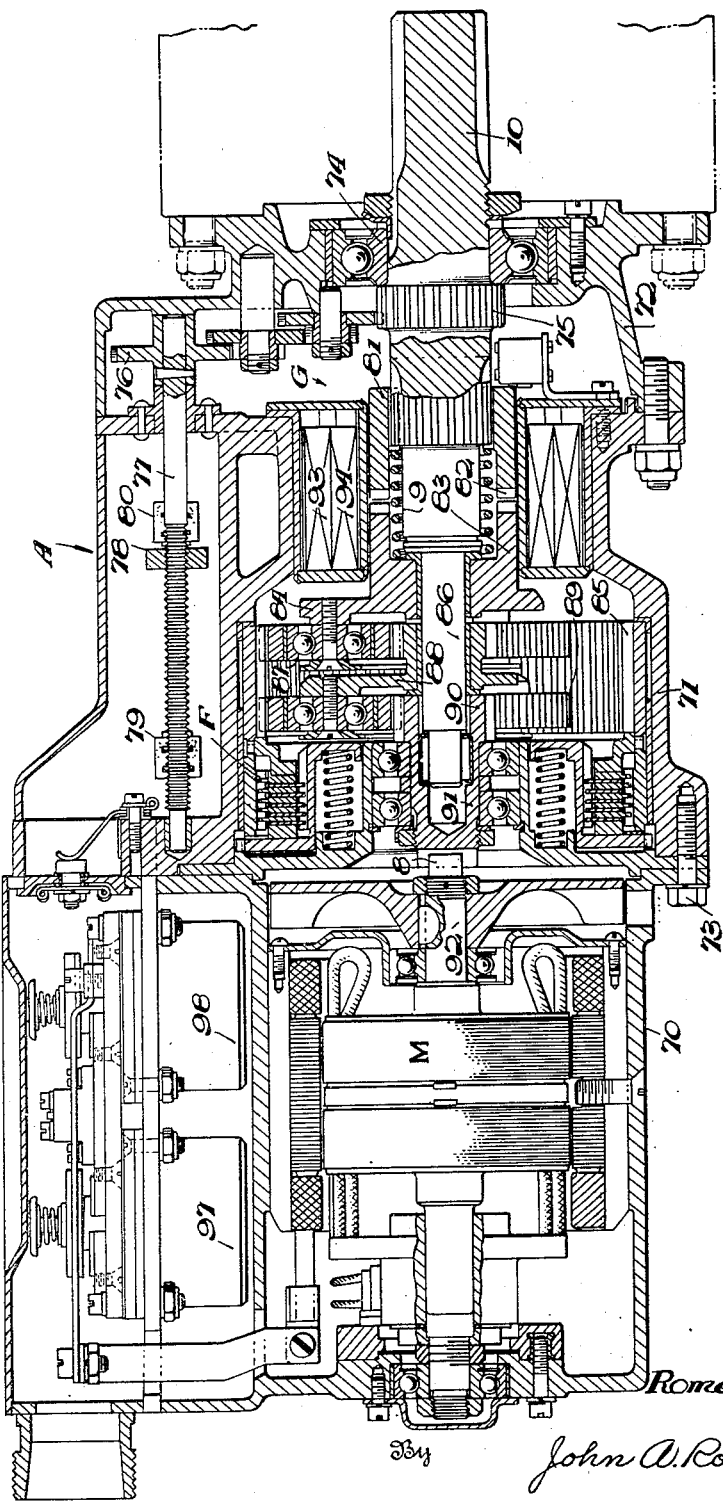

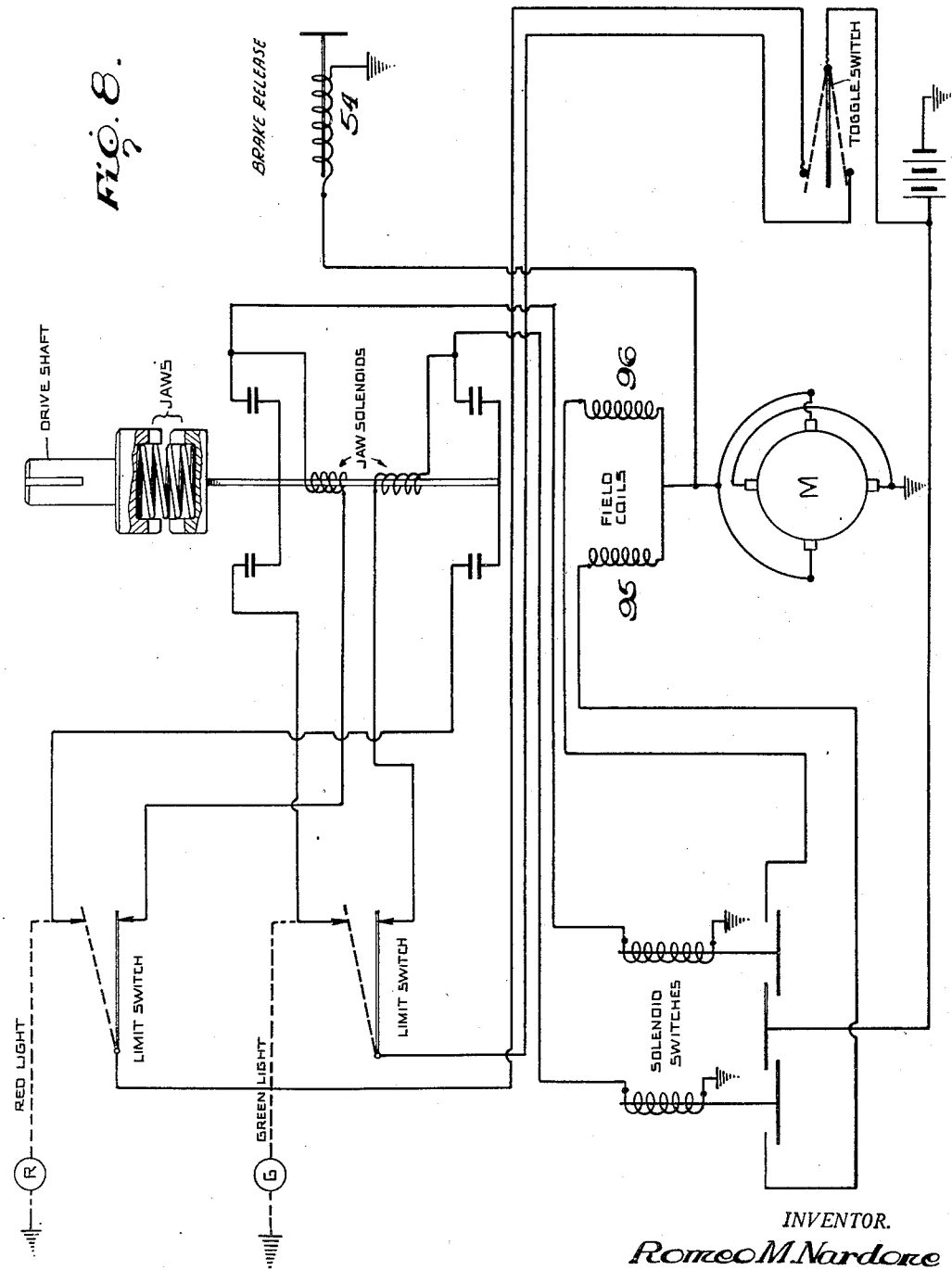

Patented Oct. 12, 1948

2,451,109

UNITED STATES PATENT OFFICE 2,451,109

ACTUATOR AND CONTROL ASSEMBLY FOR RETRACTABLE LANDING GEARS

Romeo M. Nardone, Teaneck, N. J., assignor to Bendix Aviation Corporation, Teterboro, N. J., a corporation of Delaware Application January 28, 1944, Serial No. 520,123

6 Claims. (Cl. 244—102)

1

The present invention has to do with retractable landing gears and is concerned primarily with an assembly associated therewith for actuating and controlling the raising and lowering movements of the landing gear.

The invention has in view as an important object the provision of a unit which affords a brake, a speed limiter, and a manual release for the landing gear.

Inasmuch as these landing gears are generally power actuated, a further object is the provision of an actuator unit which ordinarily causes movement of the landing gear through prescribed cycles and this actuator unit is so tied in with the brake of the unit aforesaid as to cause release of this brake whenever the actuator unit is brought into operation.

As above pointed out, the present invention contemplates a manual release for the landing gear, and a further more detailed object is the provision of mechanical means for applying the brake as the landing gear completes a predetermined "run."

Another object of the invention is associated with the feature of the speed limiter. As above pointed out, a brake is employed for controlling the movement of the landing gear. Associated with this brake is a speed-responsive device which is effective to apply variable braking effects, depending upon the speed of movement of the landing gear.

A further object is to provide, in operative association with a landing gear, an actuator unit which ordinarily is located at one side of the landing gear, and the unit embodying the brake, speed limiter and manual release, which is positioned at the opposite side. There is an electrical hook-up between the actuator unit and the brake in the second unit so as to synchronize the operation of these elements.

These and other more detailed objects and advantages will in part become apparent and in part be hereinafter stated as the description of the invention proceeds.

For a full and more complete understanding of the invention, reference may be had to the following description and accompanying drawings wherein:

Fig. 1 is an outline of the two units developing their relation to the landing gear;

Fig. 2 is an end elevation of the actuator unit;

Fig. 3 is an end elevation of the other unit;

Fig. 4 is a horizontal section through the unit, including the brake, speed limiter and manual release;

2

Fig. 5 is a vertical section through the unit of Fig. 4 being taken about on the plane represented by the line 5—5 of Fig. 4;

Fig. 6 is another vertical section taken about on the plane represented by the line 6—6 of Fig. 4;

Fig. 7 is a vertical section through the actuator unit; and

Fig. 8 is a schematic view developing the wiring diagram of the two units.

Referring to the drawing, wherein like reference characters denote corresponding parts, and particularly to Fig. 1, a hub H, of the landing gear actuating mechanism, rotates through a prescribed arc as the gear is retracted or lowered. The actuator unit A ordinarily causes these operations under power. This actuator unit is located at one end of the hub H where its output shaft 10 (see Fig. 7) extends into the hub to establish the driving relation.

The second unit B, which embraces the brake, speed limiter and manual release, is positioned on the opposite end of the hub H. The unit B includes a main control shaft 11, which is drivably received in a socket in the hub H in a manner comparable to the connection of the shaft 10 thereto. This shaft 11 is indicated in dotted lines in Fig. 1 and is developed more in detail in Fig. 4.

Referring to Fig. 4, the unit B is shown as housed within a casing made up of sections 12 and 13 which are provided with complemental flanges 14 through which extend bolts 15 to establish the assembled relation of the casing sections.

A disc carrier 17 for a friction disc brake has a flange 16 that is clamped between the flanges 14 and securely held in position by this clamping action and the bolts 15. This disc carrier is one element of a friction brake which will be later described in detail.

The casing section 12 includes a ring-like end wall 18 from which a sleeve 19 extends inwardly. The sleeve 19 carries a pair of bearing assemblies 20 and 21 which are spaced apart as illustrated, and these bearing assemblies receive and support the shaft 11 in a usual manner.

The inner end of the shaft 11 has a portion 22 splined to a second friction brake or disc carrier element 23. The disc carrier 23 is adapted for sliding movement along the shaft 11. Interfitting clutch discs 24 are carried by the carriers 17 and 23, and interfit in a well-known manner. The braking effects afforded by the elements 17, 23 and 24, depend upon the degree of engagement of the discs 24. When the discs on the member 17 are free from those on the member 23 there are no braking effects, but the braking effects gradually increase as these discs engage under greater pressure.

Where the splines 22 terminate, the shaft 11 is reduced in diameter and threaded as shown at 25, and screwed thereon is a spring retaining nut 26. An expansion spring 27 is interposed between the disc carrier 23 and the retainer 26 and normally tends to maintain the discs 24 out of engagement. An abutment ring 28 is carried by the element 23 and engages the disc pack at one end.

A ring 29 is also keyed to the shaft 11 at the splines 22, and this ring is provided with a plurality of radially outstanding ears 30 (see Fig. 5). These ears 30 are arranged in pairs and pivotally mounted between each pair is an arm 31, which is weighted at its free extremity, as indicated at 32. The opposite extremity of each of the arms 31 is formed with a cam surface 33, which is in operative engagement with the disc carrier 23.

The ring 29 and weighted arms 31 rotate with the shaft 11. The angular position of these arms with respect to the axis of the shaft, will vary depending upon the speed of rotation of the shaft as it affects the weighted ends 32 under centrifugal force. As the weighted ends 32 move radially outwardly, the engagement of the cam surfaces 33 with the disc carrier 23, moves the latter to the right, as viewed in Figure 4, and due to the engagement of the abutment ring 28 with the disc pack, causes engagement of the discs 24 to apply the brake.

The casing section 13 has an end wall 34 formed with a threaded opening 35 into which is screwed a cup-shaped member 36, the bottom of which is formed with an opening through which passes a rod 38. This rod 38 is mounted for reciprocatory movement in a heavy sleeve 39 carried by a plate 40 that is secured to the end wall 34 as by screws 41.

Adjacent the outer free end of the rod 38, the latter is formed with a groove 42, which provides a head 43. A plurality of ball elements 44 are received in the groove 42 and maintained therein by a ring retaining element 45 which is disposed about the rod 38. This ring 45 is provided with a plurality of cam sockets 46 which partially receive balls 47. The latter are also partially received in sockets 48 formed in a fixed ring 49 that is carried by the cup member 36.

A crank arm 50, Figures 1 and 3, has one end secured to the ring 45, so that swinging of the arm 50 causes rotation of the ring 45. This rotation renders effective the ball cams 47 on the cam sockets 46 and causes the ring 45 to move outwardly. This outward movement, due to the presence of the bearings 44 and their engagement with the head 43, causes a corresponding movement of the rod 38.

The inner end of the rod 38 is formed with a head 51 and the sleeve 39 is provided with a countersunk recess 52 which receives an expansion spring 53. This spring 53 engages the head 51 and normally exerts a tendency urging the rod 38 inwardly. Thus, outward movement of the rod 38 is against the influence of the spring 53.

Disposed about the sleeve 39, and positioned within the casing section, is a solenoid 54. This solenoid is supported by a cylindrical member 55 carried within the sleeve section 13 and which in turn carries a ring-like plate 56. This plate 56 is in fixed position with respect to the casing.

An armature 57 is formed with a central conical opening 58, which receives the head 51 of rod 38. The armature 57 is provided with a plurality of recesses 59 which open on to the plate 56. An expansion spring 60 is positioned in each recess 59 and bears against the fixed plate 56. These springs 60 normally exert a tendency to urge the armature 57 to the left, as viewed in Figure 3. The armature 57 carries a disc pack engaging ring 61, which is adapted to engage the discs 24 to apply the brake.

It is evident that movement to the right of armature 57 either under the influence of the solenoid 54 or rotation of the crank arm 50, will release the brake, and that inward movement of the armature 57 will permit springs 60 to move plate 57 and disc pack engaging ring 61 into engagement with the friction discs to apply the brake.

Extending upwardly from the casing section 13 is an external ear 62, Figures 1 and 3, and a corresponding ear 63 upstands from the casing section 12. A shaft 64 is journaled in the ears 62 and 63. An arm 65 is drivably carried by the shaft 64 at one end and extends downwardly where its bifurcated end 66 receives a pin 67 on the crank arm 50. The shaft 64 extends over the landing gear hub H and at this location carries a short arm 68 which is adapted to be engaged by a control element or pin 69 carried by the hub H.

When the pin 69 engages the short arm 68 the shaft 64 is rotated. This in turn swings the arm 65 which causes swinging movement of the crank arm 50. If either of the arms 50 or 65 has been operated to manually release the brake and thus permit lowering of the landing gear, when the landing gear approaches its lower limit of travel and because of the positioning of the pin 69, the latter will affect the shaft 64 to cause rotation thereof in direction causing movement of the rod 38 inwardly under the influence of the spring 53 and which movement in turn provides for the application of the brake by springs 60.

Referring to Fig. 7, the various mechanisms of the unit A are housed within a casing made up of end section 70, intermediate section 71 and inner end section 72, the several sections being fastened together by the screws represented at 73.

The inner end section 72 is provided with a bearing assembly 74 in which is journaled the output shaft 10. On the inner side of the bearing assembly 74, the output shaft 10 carries a pinion 75. A gear train G, drivably connects the pinion 75 with another pinion 76 keyed to a screw shaft 77. Threaded on this screw shaft 77 is a traveling member 78, which is adapted to alternately engage spaced limit switches 79 and 80.

The shaft 77, traveling member 78 and limit switches 79 and 80 are located in the upper portion of the intermediate casing section 71 and constitute the means for determining the length of a prescribed cycle of operation. As the member 78 moves from one limit switch to the other, the output shaft 10 will rotate through a predetermined number of revolutions.

Splined for sliding movement on the output shaft 10 is a movable jaw clutch element 81 having teeth 82 which are adapted to interfit and engage with corresponding teeth on an axially fixed rotative jaw clutch element 83. An expansion spring 9 is interposed between the jaw clutch elements 81 and 83. The latter is formed as an integral part of a planet gear carrier 84. An orbit gear annulus 85 is frictionally secured to the casing section 71, and meshing therewith, as well as with a sun gear 86, are a plurality of planet gears 87 that are carried by the carrier 84. The sun gear 86 is in turn formed as an integral part of a planet gear carrier 88 carrying planet gears 89 which mesh with the orbit gear 85 and a sun gear 90, the latter being carried by a shaft 91.

An electric motor M includes a drive shaft 92. Driving connection between the shafts 92 and 91 is by means of the tongue and slot connection 8. The friction clutch mechanism is illustrated, described, and claimed in the patents of Nardone, Patent No. 2,408,992 and Patent No. 2,391,333, and it is, therefore, believed unnecessary to here go into a detailed discussion of this friction clutch. This clutch mechanism is referred to in its entirety by the reference character F. The purpose of this friction clutch mechanism is to limit the torque on the shaft 10. Obviously, load conditions may vary and this friction clutch will accommodate the overloading by maintaining peak limiting torque value.

A pair of concentric solenoids 93 and 94 are disposed about the movable jaw element 81 and either is adapted to cause movement of the jaw element into clutch engaging position.

The motor M includes a pair of field coils 95 and 96 (see Fig. 8). The delivery of current to the field coils 95 and 96 is controlled by solenoid switches 97 and 98. When one coil is energized, the drive shaft 92 of the motor M is driven in one direction, but when the other coil is energized, the rotation is in the opposite direction.

In referring to the wiring diagram of Fig. 8, it is important to note that the solenoid 54 of the unit B is shown as tied in with the electrical circuit for the actuator unit A. Thus, when the actuator unit is started into operation, the solenoid 54 is energized to release the brake of the unit B and permit of free rotation of the shaft 11, which, of course, means that no impediment is offered to the operation of the landing gear. However, whenever the actuator unit A is stopped, the solenoid 54 is de-energized, whereupon the springs 60 move the armature 57 inwardly to cause application of the brake and hold the shaft 11 against rotation.

While a substantially comprehensive description of the operation of the actuator unit is set forth in either of the above-identified Nardone applications, it may be noted that when the toggle switch is thrown to either raise or lower the landing gear, the proper field coil of the motor M is energized to cause rotation in the required direction. At the same time, one of the solenoids 93 or 94 is also energized to move the movable clutch element 81 into engagement with the clutch element 83.

Thus, the motor is started in operation and the drive to the output shaft 10 is established. As this output shaft 10 rotates through a prescribed cycle, the gear train G turns the screw shaft 77 and causes the traveling member 78 to move into engagement with one of the contact switches. This engagement terminates the run, during which the motor M is stopped, the jaw clutch elements 81 and 83 are disengaged, and the brake of unit B is applied.

While only one embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. The combination for aircraft landing gear, of a hub having limited landing and retracting movement about its axis and carrying brake control means, a driven shaft having one end extending into one end of the hub, clutch jaw means including a driving clutch jaw at the other end of said driven shaft aligned therewith and a clutch jaw on said driven shaft, said jaws being normally forced to declutched position relative to each other, a reversible motor, motor speed reducing means and torque limiting friction clutch means connected between said motor and said driving jaw, electrically operable means operative in either direction of operation of said motor to actuate said clutch jaws to clutched relation to each other, and means comprising a brake shaft extending into the opposite end of said hub for cooperation with said driven shaft, a fixed support, a cooperating support rotative with and axially movable relative to said brake shaft, a friction disc clutch pack having axially movable discs non-rotatively supported by said fixed support and rotatively carried by said rotative support, respectively, centrifugal means carried by said rotative support at one end of said pack for adjusting the friction between said discs, disc pressing means at the other end of said pack normally biased to press the discs together, electroresponsive means for operating said disc pressing means against said bias to friction release position, movable means operative independently of said electroresponsive means for operating said disc pressing means against said bias to friction release position and normally influenced to inactive position, and means capable of manual operation for actuating said movable means against said influence to actuate said disc pressing means against said bias and adapted for operation by said brake control means to release said movable means and said die pressing means.

2. The combination for aircraft landing gear, of a hub having limited landing and retracting movement about its axis and carrying brake control means, a driven shaft having one end extending into one end of the hub, clutch jaw means including a driving clutch jaw at the other end of said driven shaft aligned therewith and a clutch jaw on said driven shaft, said jaws being normally forced to declutched position relative to each other, a reversible motor, motor speed reducing means and torque limiting means connected between said motor and said driving clutch jaw, electrically operable means operative in either direction of operation of said motor to actuate said clutch jaws to clutched relation to each other, and means comprising a brake shaft extending into the opposite end of said hub for cooperation with said driven shaft, a fixed support, variable friction means having cooperating friction means on said brake shaft and said support, respectively, centrifugal means carried by said brake shaft for adjusting the friction of said friction means, a second means for adjusting the friction of said friction means and normally biased to increase the friction thereof, electroresponsive means for operating said second means against said bias to friction release position, movable means operative independently of said electroresponsive means for operating said second means against said bias to friction release position and normally influenced to inactive position, and means capable of manual operation for actuating said movable means against said influence to actuate second means against said bias and adapted for operation by said brake control means to release said movable means and said second means.

3. The combination for aircraft landing gear, of brake control means having limited reverse movements in accordance with landing and retracting movements of the gear, driving and driven members, a motor, motor speed reducing and torque limiting means connected between said motor and said driving member, means including electrically operable means for connecting said members to, and disconnecting the same from, each other, and means comprising a brake shaft cooperating with said driven member, variable friction means cooperating between said brake shaft and a fixed element of the gear, means for adjusting the friction of said friction means in accordance with the rate of rotation of said brake shaft, second means for adjusting the friction of said friction means, electroresponsive means for operating said second means to friction release position, movable means operative independently of said electroresponsive means for operating said second means to friction release position, and means capable of manual operation for actuating said movable means to operate said second means to friction release position and adapted for operation by said brake control means to release said movable means and said second means to cause said friction adjusting means to increase its friction.

4. The combination for retractable aircraft gear having means movable in accordance with extending and retracting movements of the gear, brake control means movable in accordance with, and adapted to effect its control function at a position near the end of said extending movement, an element rotatable in accordance with said extending movement, means normally braking said element, means adapted to adjust the braking effect of said braking means in accordance with the rate of rotation of said element, electroresponsive means adapted to release said braking means near the beginning of said extending movement, and means capable of manual operation for similarly releasing said braking means and operable by said brake control means at said position to cause said braking means to brake said rotatable element.

5. The combination of means having limited reverse movements, brake control means movable in accordance with and adapted to effect its control function at a position near the end of one of said movements, an element movable in accordance with said movements, means normally braking said element, means adapted to adjust the braking effect of said braking means in accordance with the rate of movement of said element, power operated means adapted to release said braking means near the beginning of said one movement, and means capable of manual operation for similarly releasing said braking means and operable by said brake control means at said position to cause said braking means to brake said element.

6. The combination of means having limited reverse movements, brake control means movable in accordance with and adapted to effect its control function at a position near the end of one of said movements, an element movable in accordance with said movements, means normally braking said element, means adapted to adjust the braking effect of said braking means in accordance with the rate of movement of said element, power operated means adapted to release said braking means near the beginning of said one movement, and means capable of operation independently of said power operated means for similarly releasing said braking means and operable by said brake control means at said position to cause said braking means to brake said element.

ROMEO M. NARDONE.

REFERENCES CITED

The following references are of record in the file of this patent:

UNITED STATES PATENTS

| Number | Name | Date |
|---|---|---|
| 821,629 | Eifel | May 29, 1906 |
| 1,245,532 | Townsend et al. | Nov. 6, 1917 |
| 2,214,807 | Buckley | Sept. 17, 1940 |
| 2,314,019 | Shaw | Mar. 16, 1943 |
| 2,385,459 | Nelson et al. | Sept. 25, 1945 |
| 2,387,799 | Leland | Oct. 30, 1945 |